United States Patent
Vinck et al.

(10) Patent No.: US 9,187,071 B2
(45) Date of Patent: Nov. 17, 2015

(54) DISC BRAKE HAVING A CONVERSION CARTRIDGE PROVIDED WITH AN ANTI-MATTING DEVICE

(75) Inventors: Jan Vinck, Beaufort en Vallee (FR); Jean-Jacques Mace, Aulnay sous Bois (FR)

(73) Assignee: Chassis Brakes International B.V., Amsterdam (NL)

(*) Notice: Subject to any disclaimer, the term of this patent is extended or adjusted under 35 U.S.C. 154(b) by 125 days.

(21) Appl. No.: 13/976,574

(22) PCT Filed: Dec. 1, 2011
(Under 37 CFR 1.47)

(86) PCT No.: PCT/EP2011/071509
§ 371 (c)(1),
(2), (4) Date: Feb. 15, 2014

(87) PCT Pub. No.: WO2012/089440
PCT Pub. Date: Jul. 5, 2012

(65) Prior Publication Data
US 2014/0262635 A1    Sep. 18, 2014

(30) Foreign Application Priority Data
Dec. 27, 2010  (FR) .................... 10 05149

(51) Int. Cl.
*F16D 55/26*  (2006.01)
*B60T 11/10*  (2006.01)
(Continued)

(52) U.S. Cl.
CPC .............. *B60T 11/102* (2013.01); *B60T 7/102* (2013.01); *F16D 55/226* (2013.01); *F16D 65/18* (2013.01); *F16D 2121/04* (2013.01); *F16D 2121/14* (2013.01); *F16D 2123/00* (2013.01); *F16D 2125/36* (2013.01)

(58) Field of Classification Search
CPC ....... F16D 55/08; F16D 55/16; F16D 55/224; F16D 55/226; F16D 65/14; F16D 65/16; F16D 65/18; F16D 2121/14; F16D 2125/36
USPC ............... 188/71.1, 72.1, 72.6, 72.7, 72.8
See application file for complete search history.

(56) References Cited

U.S. PATENT DOCUMENTS 8,443,949 B2 * 5/2013 Mahoudeaux et al. ...... 188/72.7
8,936,137 B2 * 1/2015 Yoshikawa et al. ......... 188/72.7
(Continued)

FOREIGN PATENT DOCUMENTS

EP    1936227    6/2008
FR    2800825    5/2001

OTHER PUBLICATIONS

International Search Report for Application No. PCT/EP2011/071509 dated Feb. 28, 2012 (2 pages).

*Primary Examiner* — Thomas J Williams
(74) *Attorney, Agent, or Firm* — Michael Best & Friedrich LLP (57) ABSTRACT

Disc brake with a floating calliper and controlled brake piston, a movement conversion cartridge (200) comprising a rear part which is supported against the base of the receptacle in the calliper and a control shaft (220) which passes through the base. The cartridge (200) is retained in place by a cage (490) which is locked resiliently on the wall of the receptacle. The piston (270) comprises longitudinal ribs (274) which are placed in longitudinal grooves provided in the receptacle, with interposition of an anti-deformation device (400) interposed between the branches (274) of the piston (270) and the grooves of the receptacle of the calliper, and comprising a ring (410) which supports lugs (420) distributed according to the branches (274) and having cylindrical tongues which are curved according to the form of the cross section of the branches, and thus ensure the locking in rotation of the conversion piston (270), whilst permitting its movement of translation.

8 Claims, 5 Drawing Sheets

(51) Int. Cl.
*F16D 55/226* (2006.01)
*F16D 65/18* (2006.01)
*B60T 7/10* (2006.01)
*F16D 121/14* (2012.01)
*F16D 125/36* (2012.01)
*F16D 121/04* (2012.01)
*F16D 123/00* (2012.01)

(56) References Cited

U.S. PATENT DOCUMENTS 8,939,265 B2 * 1/2015 Vinck et al. .................. 188/72.6
2010/0252375 A1 10/2010 Chen et al.
2013/0206519 A1 * 8/2013 Vinck et al. .................. 188/72.4

* cited by examiner

DISC BRAKE HAVING A CONVERSION CARTRIDGE PROVIDED WITH AN ANTI-MATTING DEVICE

FIELD OF THE INVENTION

The present invention relates to a disc brake comprising a floating calliper which straddles the brake disc which supports a fixed block and forming a cylinder which accommodates a piston which supports a mobile block in order to clamp the brake disc, the piston being controlled by the hydraulic circuit and by the parking brake system by means of a movement conversion cartridge which transforms the pivoting movement of the brake lever, which is supported by the calliper, into movement of translation in order to thrust the brake piston;

the cylinder having a front part which accommodates the brake piston and a rear part which forms a receptacle to receive the conversion cartridge with a form of revolution which abuts the mobile block and the base of the cylinder;

the cartridge is retained in the receptacle by a clip which passes in a sealed manner through an axial orifice in the base of the cylinder, in order to connect its control shaft to the parking brake lever.

BACKGROUND OF THE INVENTION

A disc brake of this type is already known, which is described in document EP 1 936 227. This document concerns in particular a process for assembly of a disc brake, and in particular the assembly of the cartridge which converts the movement of rotation of the brake lever into a movement of translation of the brake piston, in order to apply the parking brake, or release it.

In this assembly, the rear part of the cartridge comprises a pin which goes into a hole in the base of the receptacle which receives the cartridge in the cylinder of the brake calliper. This embodiment is relatively complicated to produce and install; in addition, the pin is subjected to substantial rotation forces when the hand brake is activated.

SUMMARY OF THE INVENTION

The object of the present invention is to simplify the production of the brake calliper by reducing the number of parts which constitute the movement conversion cartridge, and the production of the calliper, whilst avoiding the risks of deformation.

Description and advantages of the invention

For this purpose, the invention relates to a disc brake of the type previously defined, characterized in that:

A) the conversion cartridge comprises:

a rear part which is supported against the base of the receptacle of the cylinder, and consists of:
  a bearing in the form of a sleeve provided with a collar which is supported around an orifice for passage of the base of the receptacle, through which the sleeve partially passes, and
  a control shaft which is connected to the pivoting lever and supports a first plate;

a front part which is supported against the brake piston, and is mobile in translation relative to the cylinder but blocked in rotation, and consists of:
  a piston provided with a second plate which is designed to co-operate with the first plate of the control shaft, with interposition of mobile balls in ramps in the two plates, in order to transform the relative movement of rotation between the two plates into movement of translation of the piston, and
  a cage for retention of the conversion piston in the cylinder by means of a clip, a return spring being interposed between the cage and the piston in order to act against the movement of translation generated by the plate and the balls;

B) at the level of its front part which forms the receptacle which receives the conversion cartridge, the cylinder comprises at least one longitudinal groove, and the conversion piston comprises on its periphery a longitudinal rib with a cross section complementary to that of the longitudinal groove, in order to co-operate with the latter and block the rotation of the front part of the cartridge, whilst leaving it free in translation;

C) an anti-deformation device, interposed between the branches of the piston and the grooves of the receptacle of the calliper, comprises a ring which supports lugs distributed according to the distribution of the branches of the piston, and having cylindrical tongues, which are substantially curved according to the form of the cross section of the branches, in order to cover the latter.

Thus, the blocking in rotation of the piston of the cartridge, i.e. the mobile nut of the cartridge, is carried out directly on the calliper; the blocking in rotation is carried out by the longitudinal rib(s) supported by the front part of the cartridge and the homologous longitudinal groove(s) provided in the receptacle of the cartridge in the calliper, with interposition of the anti-deformation device.

There is thus highly advantageously elimination of the rear case of the cartridge and its anti-rotation pin accommodated in a hole in the base of the calliper. The case of the rear part according to the prior art is replaced in the invention by a simple rear bearing with a cross section in the form of an "L". The elimination of the case of the rear part improves the drainability of the brake circuit, since there is no closed part in the conversion cartridge according to the invention. This simplifies the production of the cage and shortens the length of the cylinder or barrel of the calliper which receives the cartridge.

The invention also simplifies the assembly of the cartridge, which is carried out directly at the edge of the brake assembly chain, with elimination of a machine dedicated to the preparation of the assembled cartridge. The cage is no longer clipped onto the rear case, which prevents the risk of formation of shavings.

Finally, this embodiment can be applied to pistons with a smaller diameter than that of the pistons used at present, with identical forces exerted by the pistons.

According to another advantageous characteristic, the receptacle for the cartridge in the calliper comprises three longitudinal grooves, and the piston is provided with three longitudinal ribs, the grooves being distributed equi-angularly, and the ribs being in positions homologous to those of the grooves.

These three longitudinal grooves and the three longitudinal ribs of the piston of the cartridge permit excellent blockage in rotation of the piston of the cartridge, whilst avoiding the problems associated with the substantial torque which can be applied to the conversion piston by the connection constituted by the ball transmission between the plates. This excellent blockage in rotation is also favourable to the return of the conversion piston when the parking brake is released.

According to another advantageous characteristic, at least one groove of the receptacle has a cross section in the form of an arc of a circle, and in particular a half circle, and the rib which is supported by the piston of the cartridge has a homologous cross section in the form of an arc of a circle, i.e. which is homothetic relative to that of the groove, taking into account the thickness of the anti-deformation device. This form of groove and rib is very simple to produce.

According to another advantageous characteristic, the longitudinal rib is constituted by a branch which extends from the plate towards the rear, and straddles at least a fraction of axial length of the rear part of the conversion cartridge.

The length of the longitudinal rib, thus constituted by a branch, and in particular the length of the longitudinal ribs, of which there are preferably three, of the conversion piston, permit excellent guiding and retention of the piston in the calliper without any risk of deformation. The branches which extend towards rear make it possible to reduce the axial length of the conversion cartridge, without this being to the detriment of the guiding, all the more so since the branches are retained both by the rear bearing and by the plate of the control shaft of the cartridge, in the free space surrounded by the branches. In these conditions, even when subjected to a force which could be violent, the branches cannot be extracted from their grooves, since they are retained there, and to some extent blocked there, by the presence of the anti-deformation device of the rear part of the cartridge.

According to another advantageous characteristic, the receptacle of the cartridge comprises a shoulder which receives in a supported manner the collar of the cage and a peripheral groove to receive the clip.

According to another advantageous characteristic, the cage is a part made of resilient steel with a globally frusto-conical form and a base in the form of a crown which supports plates connected to a collar, and intermediate plates, with a free end, which receive the clip.

This cage and the co-operation of the cage, firstly with the shoulder, and secondly with the peripheral groove which receives the clip, guarantee excellent integral locking of the conversion cartridge in its receptacle. This locking is integral, and cannot open by itself. It requires a particular tool such as a sleeve which is supported on the frusto-conical form of the cage, in order to clamp progressively the strips of the cage, retract the collar, and release it from its groove. Putting into place is carried out in the same conditions, by proceeding in the inverse order.

Globally, the disc brake equipped with a movement conversion cartridge of this type with an anti-deformation device is simple to produce and assemble because of the reduced number of parts. It permits excellent functioning of the brake, and guarantees its reliability.

BRIEF DESCRIPTION OF THE DRAWINGS

The present invention will be described hereinafter in greater detail by means of the appended drawings in which.

DETAILED DESCRIPTION

By convention, in order to simplify the description of the disc brake according to the invention, use will be made of the orientation provided by the axis xx in FIG. 1, the left side of which faces what is considered to be the front, and the right side of which faces what is considered to be the rear: thus, the front of the brake piston faces its brake block and the rear of the brake piston faces its receptacle in the calliper. Similarly, the conversion cartridge will have a front part on the brake piston side, and a rear part on the side of the base of its receptacle in the calliper.

Figure 1A:
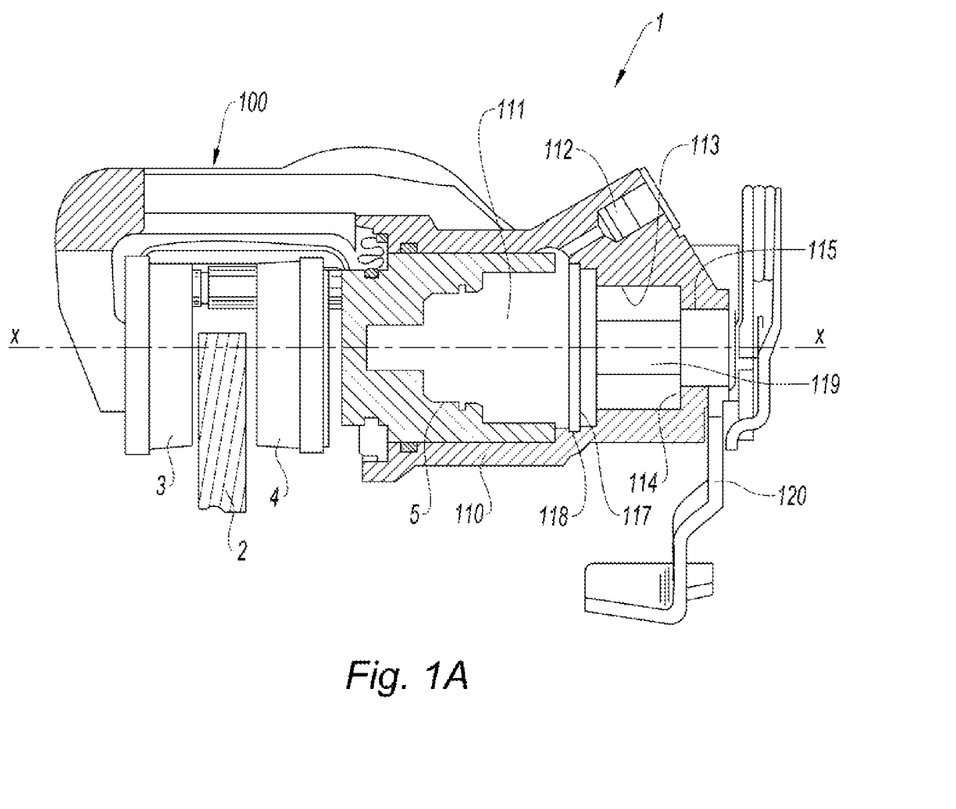
FIGS. 1A, 1B, and 1C are schematic views in cross section of a brake calliper placed on the brake disc, showing the brake piston without the conversion cartridge.
Figure 1B:
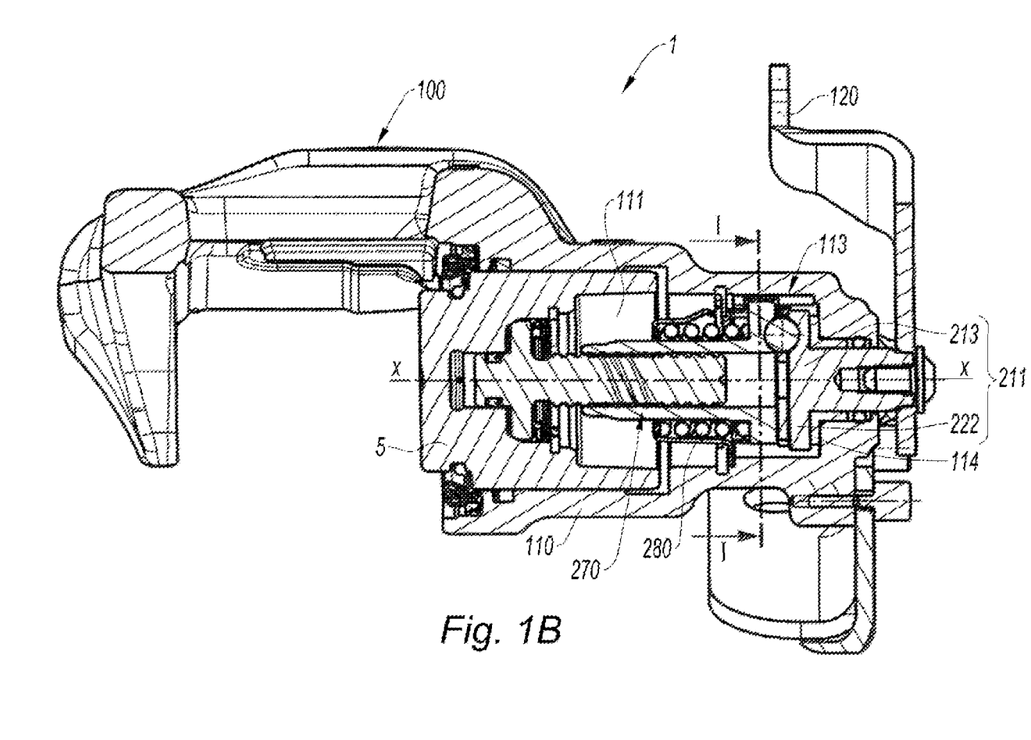
Figure 1C:
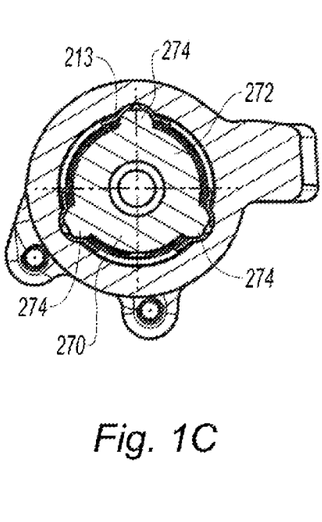

According to FIG. 1, the invention relates to a disc brake 1 associated with the braking and control circuit of the parking brake. The floating calliper 100 straddles the brake disc 2 and supports a fixed block 3 and a mobile block 4. The latter is activated by a brake piston 5 accommodated in the cylinder 110 (or barrel) of the calliper 100. This cylinder 110 delimits a sealed chamber 111 connected to the brake circuit by branching 112, not shown. This sealed chamber 111 accommodates a movement conversion cartridge 200 (FIG. 2) applied against the base 114 of the receptacle 113 of the cylinder of the calliper. The receptacle 113 prolongs the cylinder 110 of the brake piston. The base 114 is provided with an orifice 115 which passes in a sealed manner through the end of the cartridge 200 (FIG. 2) for the drive connection with the pivoting lever 120 which is connected to the control of the handbrake, the movement of rotation (pivoting) of which will be transformed into movement of translation applied to the brake piston 5.

Figure 2:
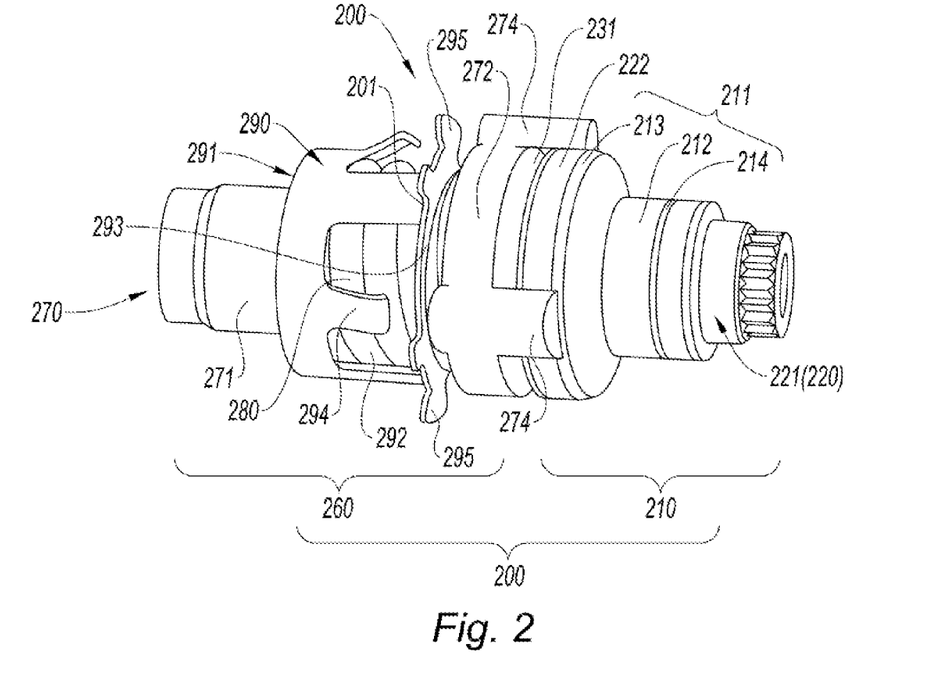
FIG. 2 shows a lateral view slightly in perspective of the conversion cartridge without the anti-deformation device.

The movement conversion cartridge 200 represented in FIG. 2 consists of a rear part 210 and a front part 260. It is represented without the anti-deformation device 300 (FIGS. 4) and 400 (FIGS. 5A. B).

The rear part 210 is formed by a bearing 211 comprising a sleeve 212 provided with a collar 213. The sleeve 212 is placed in the orifice 115 in the base 114 of the calliper 100, and its collar 213 is supported on the surface of the base 114 which surrounds the orifice 115. The bearing 211 provided with an o-ring seal 214 to ensure the sealing relative to the orifice 115, receives a control shaft 220 constituted by a cylindrical part 221 which ends at the front in a first plate 222. The cylindrical part 221 passes through the sleeve 212 of the bearing 211 in order to project at the rear of the calliper, and receive the activating lever 120 of the parking brake. The plate 222 is supported against the collar 213 of the bearing 211. The front surface of the plate 222 is provided with grooves with a variable depth in order to co-operate with balls which are supported by a cage 231, and which cooperate in the same conditions with the conversion piston 270 which is blocked in rotation but mobile in translation.

The front part 260 of the cartridge 200 consists of the conversion piston 270 constituted by a sleeve 271 which supports at the rear a plate 272 (second plate), the surface of which is provided with grooves with a variable depth, which are complementary in their arrangement and form to those of the grooves of the first plate 222 of the control shaft 220. The balls roll in the homologous grooves of the plate 222 of the control shaft 220 and that 272 of the piston 270, in order to transform the movement of rotation of the plate 222 of the control shaft 220 into movement of translation of the conversion piston 270 by means of the play of the complementary ramps formed by the grooves, as is known in itself. The front part 260 also comprises a compression spring 280 which is fitted onto the cylindrical sleeve 271 of the conversion piston, and is supported firstly against the plate 272 of the piston 270, and secondly against the base 291 of a cage 290 which is also installed on the sleeve 271 of the piston 270.

The cage 290 is a part made of resilient steel with a globally frusto-conical form, comprising a crown which constitutes the base 291 on the front side, and supports plates 292 which are connected to a split collar 293 which faces towards the exterior, with projecting parts 294, and intermediate plates 295 which are free. A clip 201 is installed in the cage 290, around and between the plates 292, 294, in order to retain the cartridge 200 in its receptacle 113 of the calliper 100. For putting into place in a known manner, the split collar 293 and the clip 201 are compressed by means of a tool in the form of a sleeve. The clip 201 retains the cage 290 by co-operating with a peripheral groove 118 of the cylinder 110, and the split collar 293 is placed in the receptacle 113 against a shoulder 117 in the calliper 100, as carried out by the assembly process described in document EP 1 936 227, which is cited here by way of reference. The cartridge 200 is thus blocked in its receptacle 113 in one direction by its support by means of the split collar 293 against the shoulder 117, and in the opposite direction by the clip 201 which is locked in the peripheral groove 118, with only the control rod 220 and the piston 270 remaining free in movement.

Figure 3:
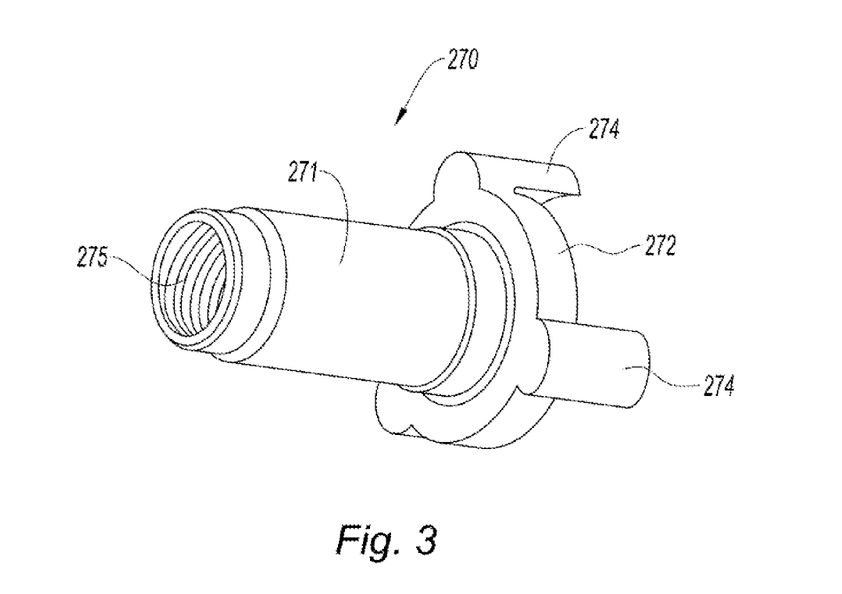
FIG. 3 is a view in perspective of the piston of the conversion cartridge.

The piston 270 (FIG. 3) comprises longitudinal ribs which in this example are constituted by branches 274 which extend the plate 272 towards the rear. These branches 274, with a cross section with a form which is semi-circular, or crescent shaped, are accommodated by sliding in grooves 119 with a corresponding cross section provided in the wall of the receptacle 113 of the calliper 100, in positions homologous to those of the branches, with interposition of an anti-deformation device 300, 400, according to FIG. 4 or 5A, 5B. There are preferably three branches 274 distributed equi-angularly around the axis xx of the receptacle 113. The piston 270 is thus blocked in rotation in the receptacle 113, whilst remaining free in translation. The branches 274 straddle the rear part 210 at the level of the edge of the plate 222 and the collar 213 of the bearing 211. The disc which forms the cage 231 which holds the balls is also retained by the branches 274, which is important for the production of the subassembly constituted by the conversion cartridge 200, and facilitates considerably putting it into place in the receptacle 113.

After installation of the cartridge 200, the control shaft 220 and its plate 222 are on the other hand free in rotation, such that the movement of rotation of the control shaft 220 takes the form of relative rotation of its plate 222 in relation to the plate 272 which is integrated with the piston 270, thus producing the movement of translation of the piston 270, transmitted to the brake piston 5.

The conversion piston 270 is supported against the rear of the brake piston 5 by a wear compensator not represented, accommodated in the piston 270 and forming the nut of a screw-nut connection. The compensation for the wear of the brake blocks is carried out in a manner known to persons skilled in the art during the movement of withdrawal of the nut, when the parking brake is released.

Figure 4:
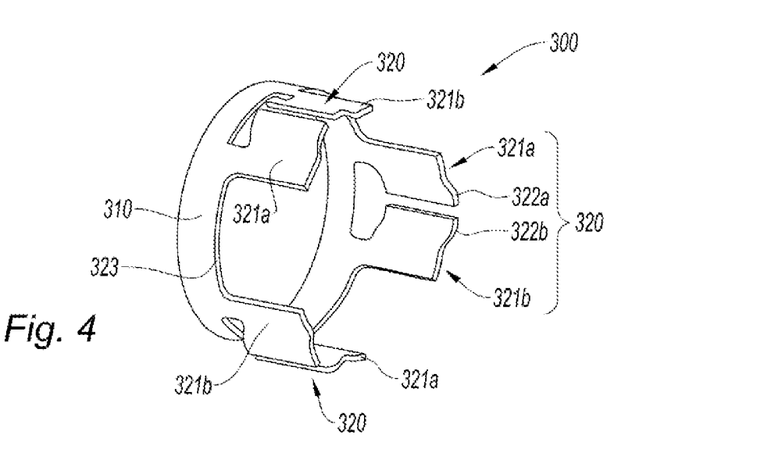
FIG. 4 is a view in perspective of a first embodiment of the anti-deformation device of the conversion cartridge.

FIG. 4 shows an anti-deformation device 300 which is designed to be interposed between the branches 274 of the piston 270 and the grooves 119 of the receptacle 113 of the calliper 100.

The anti-deformation device 300 is a part made of metal plate with a cylindrical ring 310 which supports lugs 320, each formed by two strips 321a, b provided with curved cylindrical tongues 322a, b, which substantially have the radius of the circular cross section of the ribs in the form of branches 274, such as to be interposed between, and, if applicable, to be applied on, the ribs 274; the strips 321a, b are then placed on both sides of each rib 274.

The ring 310 covers partially the contour of the plate 272 between the ribs which form the ribs 274, and the edge 223 of the ring between the strips 321a, b is placed against the front of the ribs 274.

In this device 300, the lugs 320 are distributed equi-angularly in a number equal to that of the branches 274, i.e. three.

The anti-deformation device 300 is engaged on the plate 272 of the branches 274 of the piston 270, before putting into place of the spring 280 and the cage 290, as well as the clip 201. This anti-deformation device 300 is not represented on the movement conversion cartridge 200 in FIGS. 2A, 2B.

Figure 5A:
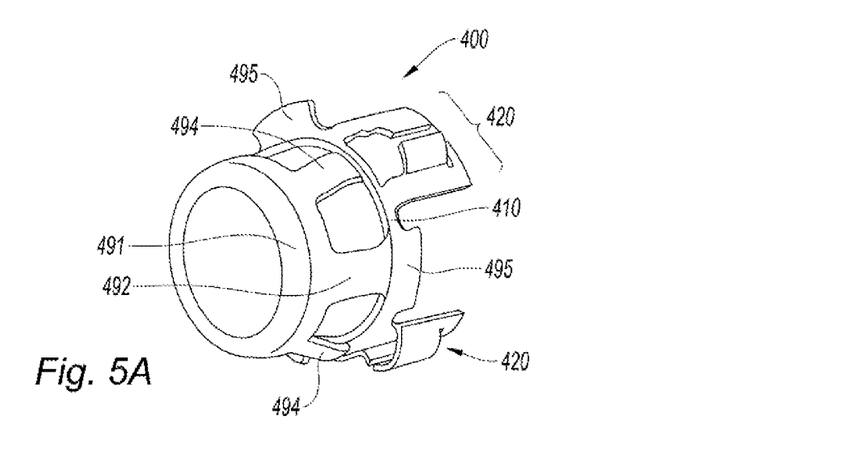
FIG. 5 shows in its parts 5A, 5B two views in perspective, according to different directions, of a second embodiment of an anti-deformation device integrated in the cage of the cartridge.
Figure 5B:
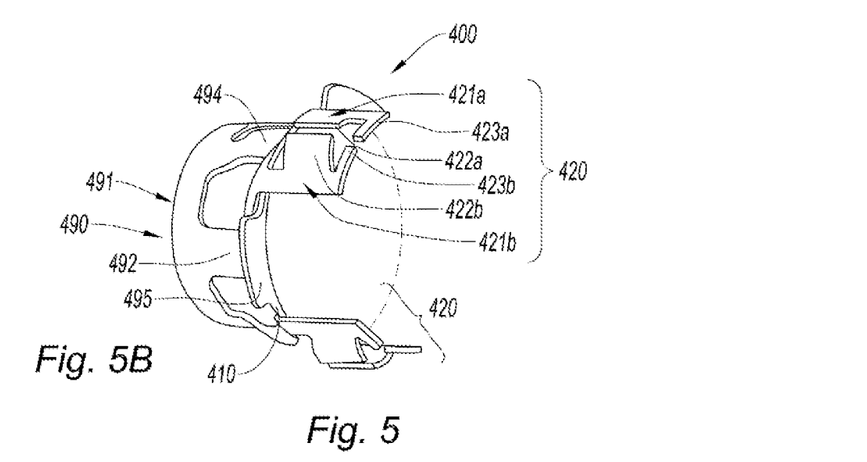

In its parts 5A, 5B, FIG. 5 shows a variant embodiment of the anti-deformation device 400, combined in this case with a cage. The device 400 consists of a ring 410 in the form of a split collar, which supports lugs 420 which are distributed equi-angularly, and in a number corresponding to that of the ribs in the form of branches 274 of the piston 270, i.e. there are three of them, with distribution at 120°. The lugs 420 each consist of two strips 421a, b which support curved cylindrical tongues 422a, b, having substantially a cross section which is homothetic relative to that of the branches 274 of the piston 270.

The strips 421a, b, end in retention noses 423a, b, such as to be placed behind the end of the branches 274, and to be locked behind the latter, whilst maintaining the resilience of the lugs 420.

The lugs 420 are supported by the ring in the form of a split collar 410 provided with parts 495 which project in the radial direction, and can be assimilated to the collar 293 and to its projecting parts 295 of the cage 290 of the embodiment in FIG. 2. The split collar 410 is connected by plates 492 with a ring with a return which forms a base 491. The base 491 also supports intermediate plates 494 which project resiliently. The assembly of the plates 492 and the intermediate plates 494 with the base 491 and the ring in the form of a split collar 410 globally has a frusto-conical form.

According to the embodiment represented, the assembly has a ternary structure, with three lugs 420, three plates 492, and three intermediate plates 494. The intermediate plates 494 have the same function as the intermediate plates 294 of the cage 290. The elements 491, 492, 494, 495 with the split collar 410 and its projecting parts constitute a cage 490.

Figure 6A:
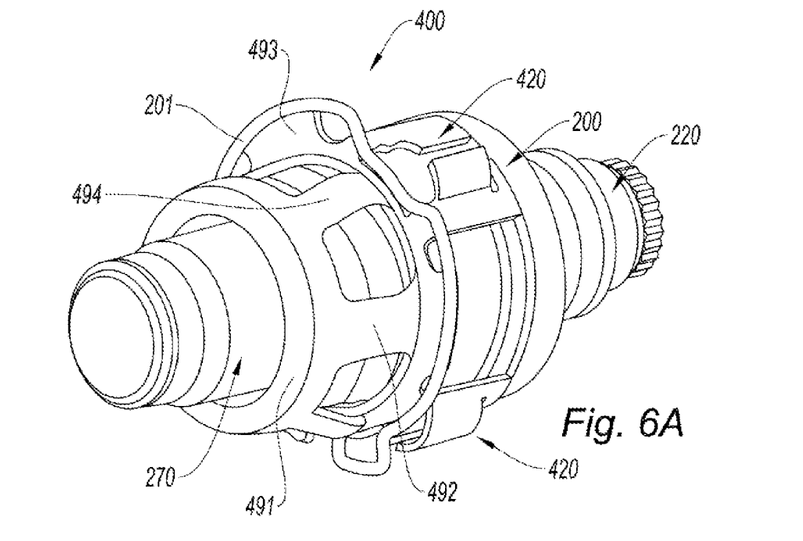
FIGS. 6A, 6B are views in perspective according to different directions of the conversion cartridge, equipped with the anti-deformation device according to FIGS. 5A, 5B.
Figure 6B:
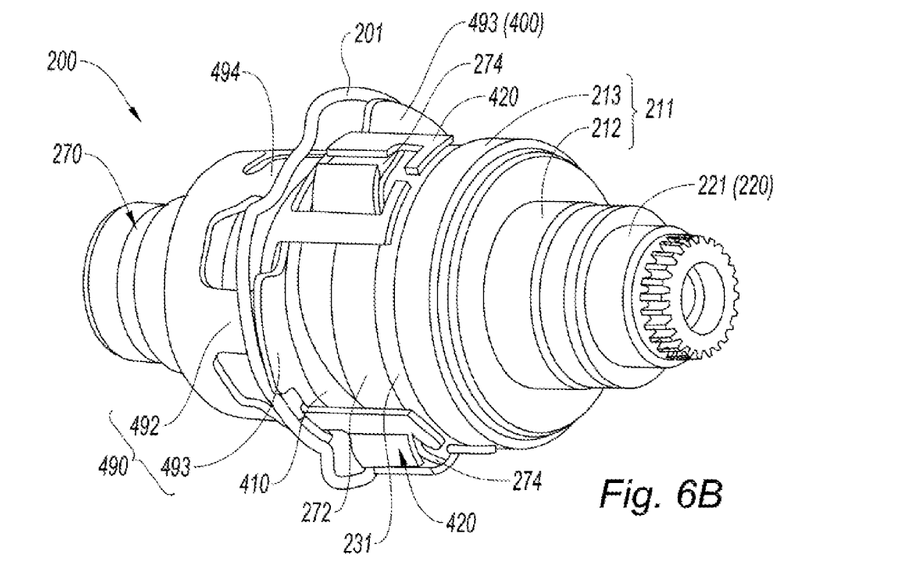

FIGS. 6A, 6B show the assembly of the anti-deformation device 400 on the conversion cartridge 200 with the clip 201. FIG. 6B shows in particular the locking of the retention noses 423a, b behind the branches 274 of the piston 270, which branches are also surrounded by the cylindrical tongues 422a, b and the strips 421a, b supported on the periphery of the plate 272 of the piston. The other parts of the cartridge which also have references will not be described again.

The cartridge 200 consists of a reduced number of parts, and constitutes an assembled unit, ready to be installed in the barrel of the brake calliper 100. This putting into place does not impede or complicate the subsequent installation of the brake piston, and does not then disrupt the draining of the brake circuit.

The present invention relates to the field of disc brake systems of motor vehicles.

LIST OF THE MAIN ELEMENTS

1 Disc brake
5 Brake piston

100 Calliper
110 Cylinder
111 Piston chamber
113 Receptacle
114 Base of the receptacle
115 Orifice of the base of the receptacle
117 Shoulder
118 Peripheral groove
119 Groove
120 Lever
200 Movement conversion cartridge
201 Clip
210 Rear part of the cartridge
211 Bearing with cross section in the form of a "T"
212 Sleeve
213 Collar
214 O-ring seal
220 Control shaft
221 Cylindrical part
222 First plate
231 Cage which receives the balls
260 Front part of the cartridge
261 Conversion piston
262 Sleeve
263 Second plate
274 Rib/longitudinal branch
275 Nut
280 Compression spring
290 Cage
291 Base
292 Plate
293 Split collar
294 Intermediate plate
295 Projecting part
300 Anti-deformation device
310 Ring
320 Lugs
321a,b Strips
322a,b Curved cylindrical tongues
323 Edge of the ring
400 Anti-deformation device
410 Ring in the form of a split collar
420 Lugs
421a,b Strips
422a,b Cylindrical tongues
423a,b Retention noses
490 Cage
491 Base
492 Plate
493 Split collar
494 Intermediate plate
495 Projecting part

The invention claimed is:

1. A disc brake comprising a floating calliper (100) which straddles the brake disc (2) which supports a fixed block (3) and forming a cylinder (110) which accommodates a piston (5) which supports a mobile block (4) in order to clamp the brake disc, the piston (5) being controlled by an hydraulic circuit and by a parking brake system by means of a movement conversion cartridge (200) which transforms the pivoting movement of the parking brake lever, which is supported by the calliper (100), into movement of translation in order to thrust the brake piston (5);

the cylinder (110) having a front part which accommodates the brake piston (5) and a rear part which forms a receptacle (113) to receive the conversion cartridge (200) with a form of revolution which abuts the mobile block and the base of the cylinder;

the conversion cartridge (200) is retained in the receptacle (113) by a clip (201) which passes in a sealed manner through an axial orifice in the base (114) of the cylinder, in order to connect its control shaft to the parking brake lever (120), which brake is characterized in that:

A) the conversion cartridge (200) comprises:
a rear part (210) which is supported against the base (114) of the receptacle (113) of the cylinder (110), and consists of:
a bearing (211) in the form of a sleeve (212) provided with a collar (213) which is supported around an orifice (115) for passage of the base of the receptacle (113), through which the sleeve (212) partially passes, and
a control shaft (220) which is connected to the pivoting lever (120) and supports a first plate (222);
a front part (260) which is supported against the brake piston (5), and is mobile in translation relative to the cylinder (110) but blocked in rotation, and includes:
a conversion piston (270) provided with a second plate (272) which is designed to co-operate with the first plate (222) of the control shaft (220), with interposition of mobile balls in ramps in the two plates (222, 272), in order to transform the relative movement of rotation between the two plates (222, 272) into movement of translation of the conversion piston (270), and
a cage (290) for retention of the conversion piston (200) in the cylinder (110) by means of the clip (201),
a return spring (280) being interposed between the cage (290) and the conversion piston (270) in order to act against the movement of translation generated by the plates (222, 272) and the balls;

B) at the level of its front part which forms the receptacle (113) which receives the conversion cartridge (200), the cylinder (110) comprises at least one longitudinal groove (119), and the conversion piston (270) comprises on its periphery at least one longitudinal rib (274) with a cross section complementary to that of the longitudinal groove (119), in order to co-operate with the latter and block the rotation of the front part (260) of the cartridge (200), whilst leaving the conversion piston (270) free in translation;

C) an anti-deformation device (300, 400), interposed between the longitudinal ribs (274) of the conversion piston (270) and the longitudinal grooves (119) of the receptacle (113) of the calliper (100), comprises a ring (310, 410) which supports lugs (320, 420) distributed according to the distribution of the longitudinal ribs (274) of the conversion piston, and having cylindrical tongues (322a, b; 422a, b), which are substantially curved according to the form of the cross section of the branches (274), in order to cover the branches (274) in the longitudinal grooves (119) of the receptacle (113) of the cylinder (110).

2. The disc brake according to claim 1, characterized in that:
the receptacle (113) for the conversion cartridge (200) in the calliper (100) comprises three longitudinal grooves (119), and the conversion piston (270) is provided with three longitudinal ribs (274), the grooves (119) being distributed equi-angularly, and the longitudinal ribs (274) being in positions homologous to those of the grooves (119).

3. The disc brake according to claim 1, characterized in that:

the longitudinal groove (119) of the receptacle (113) has a cross section in the form of an arc of a circle, and in particular a half circle, and the longitudinal rib (274) which is supported by the conversion piston (270) of the conversion cartridge (200) has a cross section in the form of an arc of a circle which is homothetic relative to that of the longitudinal groove (119), taking into account the thickness of the anti-deformation device (300, 400).

4. The disc brake according to claim 1, characterized in that:

the longitudinal rib (274) is constituted by a branch which extends from the plate (272) towards the rear, and straddles at least a fraction of axial length of the rear part (210).

5. The disc brake according to claim 1, characterized in that:

the receptacle (113) of the conversion cartridge (200) comprises a shoulder (117) which receives in a supported manner the collar (293) of the cage (290) and a peripheral groove (118) to receive the clip (201).

6. The disc brake according to claim 1, characterized in that:

the cage (290) is a part made of resilient steel with a globally frusto-conical form and a base (291) in the form of a crown which supports plates (292) connected to a split collar (293), and intermediate plates (294), at the free end, which receive the clip (201).

7. The disc brake according to claim 1, characterized in that:

the anti-deformation device (400) comprises lugs (420) which are integral with a first ring in the form of a split collar (410) which is provided with projecting parts (491) and is connected by plates (492) to a second ring with a return which forms a base (491) which itself supports intermediate lugs (494) which project resiliently and the assembly constitutes a cage (490) which supports the lugs (420).

8. The disc brake according to claim 7, characterized in that:

the lugs (420) comprise strips (421*a, b*) which end in retention noses (423*a, b*) beyond the curved cylindrical tongues (422*a, b*), in order to be locked behind the end of the longitudinal ribs (274) of the conversion piston (270).

* * * * *